J. L. BECK.
PAWL AND RATCHET MECHANISM.
APPLICATION FILED JULY 14, 1911.

1,075,311.

Patented Oct. 7, 1913.

WITNESSES:
G. R. Driscoll.
R. M. Mowry.

INVENTOR,
John L. Beck,
BY
ATTORNEY.

UNITED STATES PATENT OFFICE.

JOHN L. BECK, OF SPRINGFIELD, MASSACHUSETTS, ASSIGNOR TO B. F. PERKINS AND SON, INCORPORATED, OF HOLYOKE, MASSACHUSETTS, A CORPORATION OF MASSACHUSETTS.

PAWL-AND-RATCHET MECHANISM.

1,075,311.        Specification of Letters Patent.        Patented Oct. 7, 1913.

Application filed July 14, 1911. Serial No. 638,528.

*To all whom it may concern:*

Be it known that I, JOHN L. BECK, a citizen of the United States of America, and resident of Springfield, in the county of Hampden and State of Massachusetts, have invented certain new and useful Improvements in Pawl-and-Ratchet Mechanisms, of which the following is a full, clear, and exact description.

The objects of this invention are firstly to provide a pawl and ratchet mechanism of such character and construction that when its first element is moved in the proper direction relatively to the second element, and for securing the rotation of the latter, there will be an almost imperceptible amount of lost motion before, under the rotation of the first element, the second one is rotatively forced; and, secondly, to provide such a construction and arrangement of the parts whereby, although a series of pawls are provided, but one is moved at a given time, the active or working pawl in its forcing interlock with an adjacent pawl tooth has its engagement by a side thereof and is reinforced and resisted at its opposite side by the wall of a socket in which it is located and slidably movable.

The invention is described in conjunction with the accompanying drawings and is set forth in the claims.

Figure 1:
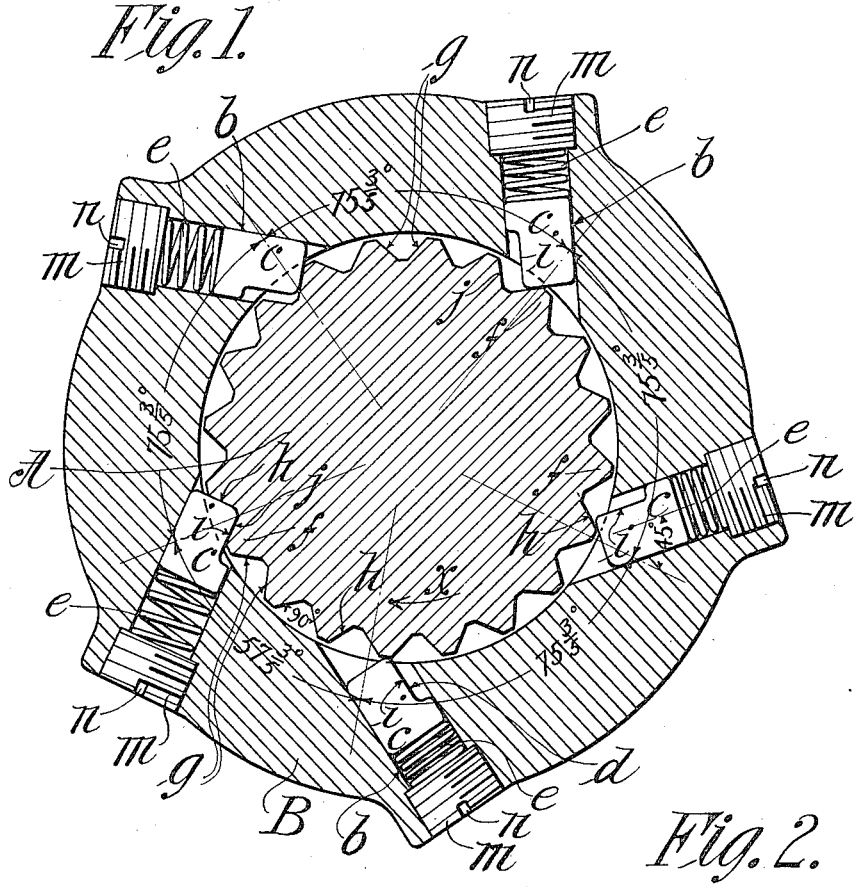
Figure 2:
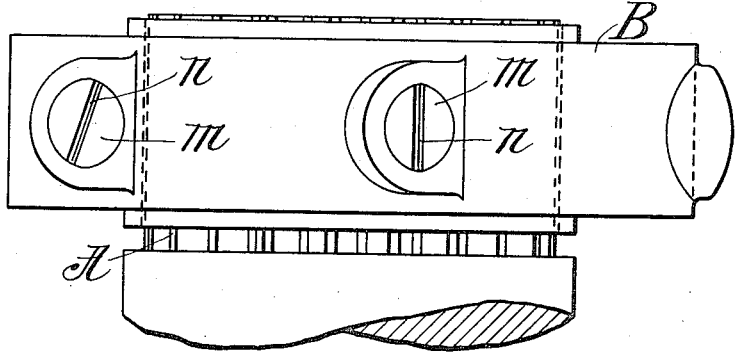
Figure 3:
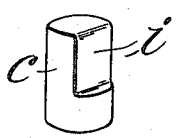

In the drawings:—Figure 1 is a sectional view through the pawl and ratchet mechanism taken on the plane of the pawls and at right angles to the axis of the tooth provided element. Fig. 2 is a plan view of the device. Fig. 3 is a perspective view of one of the pawls.

In the drawings, A represents a circular element or shaft having a series of rectangularly spaced peripheral teeth $f$, the walls $g$ in the separating spaces between which teeth are at exactly or substantially right angles to each other. For efficiency and ease of operation of the device the points of the teeth are made blunt or flattened as shown.

The annular element B or collar which encircles the toothed element A is made with a plurality of sockets $b$ which extend from the outer to the inner walls of the part B, and the axial lines of which are at right angles to the clicking faces $h$ of the teeth.

$c\ c$ represent spring pressed pawl blocks, preferably of cylindrical form and fitted in the correspondingly shaped socket therefor to freely slide inwardly and outwardly. These pawl blocks have their inner ends formed right angular to their lengths for engagement against the clicking faces $h$ of the teeth and have flattened sides $i$ parallel with their axes to be facewise engaged by the locking faces $j$ of the teeth. The extents of separation between the sockets are non-divisible of the circular extent of all of the teeth provided to the element A, that is such extents of separation are non-multiples of any given number of the teeth so that when one pawl for instance, as shown in Fig. 1, the lower left hand one, has its locking flattened side in engagement with the locking face $j$ of the adjacent tooth, the pawl at the upper left hand part will be slightly away from engagement, the pawls at the upper extreme right hand portions being more and more out of engagement, while the lowermost pawl is riding over the flattened point of one of the teeth. Thus in operation assuming the internal or toothed shaft member is rotated in the direction of the arrow $x$, or the pawl carrying member is rotated in the opposite direction, the parts will be compelled to move together with practically no initial lash or lost motion, there being a reinforcement for every pawl by the wall of the socket which is next to its side opposite its flattened or locking engagement side $i$. The pawls are kept to their work by the spiral springs $e$ accommodated in the socket $b$ and held in compression by the plugs $m$ which are peripherally threaded and screw engaged in the mouths of the sockets. The said plugs are provided with screw driver slots $n$ whereby they may be readily rotated to be sunk in their places and as easily removed when occasion therefor for replacement of a pawl or spring is necessary or desirable. The screw plugs may be also utilized for varying the compression of the springs to render the clicking action of the pawls either sensitive or hard as may be preferred.

In the example of the invention here shown, the toothed element is one made with 20 teeth, and although five pawls and their accessories are provided, their arrangement is such that while the one as shown is in interlock, the others will have their faces at successively increasing distances from the working faces of the teeth respectively adjacent thereto; and in the design in which the mechanism has been worked out as here shown, the spaces between the axes of 4 of the pawls are equal to 75¾ degrees of a circle, while the space between the two of the pawls having the closest relative arrangement is 57⅜ degrees of a circle, but, of course, the number of teeth, the number of the pawls and the positioning of the pawls would be varied in different pawl and ratchet mechanisms of different sizes without, however, altering the character and capabilities of the device which have been hereinabove set forth; and it is also manifest that inversions or reversals of the relations of the parts may be made under this invention.

This pawl and ratchet mechanism is especially desirable in safety cranking or starting mechanism for explosive engines, and has primarily been designed by me for such purpose, but its use is not limited in any particular situation, mechanism or machine, it being manifest from the constructions of the parts and the organization or arrangement thereof that this invention provides pawl and ratchet mechanism which is extremely strong and durable in use, capable of its operation without appreciable lash or lost motion, and one in which the pawls are concealed and protected against dirt or other clogging substances; and one in which by the absence of pivots not only extreme simplicity is acquired but the avoidance and necessity for replacement more common in pawl and ratchet mechanisms in which pawls are pivotally hung upon the pawl carrier. The opposite faces of the teeth occupy the same angular relation to the axis of the shaft, instead of different angular relations, and this construction permits of the reversing of the pawls on the shaft, so that clutching action will take place against either set of the faces of the teeth. All of the faces are tangential to the curvature of the shaft, and when the collar B is reversed on the shaft the faces of the teeth previously in normal parallel relation with the fully seated pawls will be at right angles thereto.

I claim:—

1. A ratchet mechanism comprising a shaft having a series of terminal teeth, the opposite faces of which are inclined in a common direction and the confronting faces of which are right angular to each other, a collar adapted to be reversed on the shaft and provided with a series of inclined sockets, and a series of spring pressed pawls in said sockets and adapted to co-act with the teeth in either position of the collar on the shaft and when the shaft is rotated in either direction, each of said pawls having a flat end face and a flat side face right angular to each other, and adapted to engage the confronting faces of the teeth.

2. A ratchet mechanism comprising a shaft having a series of radial terminal teeth, the opposite faces of which are inclined in a common direction and the confronting faces of which are right angular to each other, a collar slidably positioned on the shaft and adapted to be reversed thereon and formed with a series of sockets, and a series of independently acting spring pressed pawls slidable in the sockets to co-act with the teeth in either position of the collar on the shaft, each of said pawls having a flat end face and a flat side face right angular to each other, and adapted to engage the confronting faces of the teeth.

Signed by me at Springfield, Mass., in presence of two subscribing witnesses.

JOHN L. BECK.

Witnesses:
WM. S. BELLOWS.
G. R. DRISCOLL.